(12) United States Patent　(10) Patent No.: US 9,201,188 B2
Kim et al.　(45) Date of Patent: Dec. 1, 2015

(54) BLACKLIGHT UNIT, LIQUID CRYSTAL DISPLAY DEVICE HAVING THE SAME AND FABRICATION METHOD THEREOF

(71) Applicant: LG DISPLAY CO., LTD., Seoul (KR)

(72) Inventors: Hee-Cheoul Kim, Paju-si (KR); Ju-Young Bang, Seoul (KR); Dong-Seok Lee, Bucheon-si (KR); Yeong-Eun Son, Paju-si (KR); Min-Gyu Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/090,458

(22) Filed: Nov. 26, 2013

(65) Prior Publication Data

US 2014/0160397 A1　Jun. 12, 2014

(30) Foreign Application Priority Data

Nov. 30, 2012　(KR) ........................ 10-2012-0138189

(51) Int. Cl.
*G02F 1/1335*　(2006.01)
*F21V 8/00*　(2006.01)

(52) U.S. Cl.
CPC ............ *G02B 6/0065* (2013.01); *G02B 6/0036* (2013.01); *G02B 6/0051* (2013.01); *Y10T 29/49117* (2015.01)

(58) Field of Classification Search
CPC .................... G02B 6/0038; G02F 1/133615
USPC .................... 349/65, 106; 362/615, 620, 626
See application file for complete search history.

(56) References Cited

U.S. PATENT DOCUMENTS

| 2001/0053075 | A1 | 12/2001 | Parker et al. |
| 2003/0137824 | A1 | 7/2003 | Shinohara et al. |
| 2003/0160911 | A1* | 8/2003 | Kano ............................. 349/65 |
| 2004/0263717 | A1* | 12/2004 | Hsu et al. ....................... 349/62 |
| 2009/0316433 | A1* | 12/2009 | Shim et al. .................... 362/613 |
| 2012/0099056 | A1* | 4/2012 | Lee et al. ...................... 349/106 |

FOREIGN PATENT DOCUMENTS

| EP | 1143270 | A2 | 10/2001 |
| EP | 1331495 | A2 | 7/2003 |
| EP | 1336876 | A1 | 8/2003 |
| EP | 2159483 | A2 | 3/2010 |

(Continued)

OTHER PUBLICATIONS

Extended European Search Report issued in corresponding European Patent Application No. 13193295.6, mailed Feb. 17, 2014, 8 pages.

(Continued)

*Primary Examiner* — Thanh-Nhan P Nguyen
(74) *Attorney, Agent, or Firm* — Brinks Gilson & Lione

(57) ABSTRACT

A backlight unit and a liquid crystal display device having the same which may facilitate control of output light through a light guide plate, improve light concentration effect, and reduce moire. The backlight unit includes light sources generating light, a light guide plate guiding light through an incidence surface opposite the light sources, emitting the light through an emission surface, and having lower patterns of a prism shape formed on the lower surface of the light guide plate opposite the emission surface by inclined surfaces and sub-inclined surfaces, and at least one optical sheet stacked on the emission surface.

17 Claims, 17 Drawing Sheets

(56) References Cited

FOREIGN PATENT DOCUMENTS

| | | |
|---|---|---|
| JP | 2003-121653 | 4/2003 |
| JP | 2007-066556 | 3/2007 |
| JP | 2009-176592 | 8/2009 |
| JP | 2010-108795 | 5/2010 |
| JP | 2010-204256 A | 9/2010 |
| KR | 1020010022372 A | 3/2001 |
| KR | 1020030006623 A | 1/2003 |
| KR | 1020090043959 A | 5/2009 |
| TW | 200409974 A | 6/2004 |
| TW | I243920 B | 11/2005 |
| TW | I283327 B | 7/2007 |

OTHER PUBLICATIONS

Office Action issued in Korean Patent Application No. 10-2012-0138189, mailed Jul. 24, 2014, 7 pages.

Office Action issued in corresponding Korean Patent Application No. 10-2012-0138189, mailed Jan. 28, 2014, 8 pages.

Office Action dated May 20, 2015 for corresponding Taiwanese Patent Application No. 102143098, 26 pages.

Office Action dated Aug. 3, 2015 for corresponding Chinese Patent Application No. 201310629712.5, 17 pages.

* cited by examiner

Moire Free

BLACKLIGHT UNIT, LIQUID CRYSTAL DISPLAY DEVICE HAVING THE SAME AND FABRICATION METHOD THEREOF

This application claims the benefit of priority to Korean Patent Application No. 10-2012-0138189, filed on Nov. 30, 2012, which is hereby incorporated by reference as if fully set forth herein.

BACKGROUND

1. Field of the Disclosure

The present disclosure relates to a backlight unit and a liquid crystal display having the same, and more particularly, to a backlight unit which may facilitate control of output light through a light guide plate, improve light concentration effect, and reduce moire, a liquid crystal display device having the same, and a fabrication method of the backlight unit.

2. Discussion of the Related Art

In general, liquid crystal display devices (LCDs) have been widely used due to advantages thereof, such as low-power consumption, thin profile, excellent quality, etc. A liquid crystal display device includes two substrates disposed opposite each other and a liquid crystal panel consisting of liquid crystals interposed between the two substrates. The liquid crystal panel displays an image by varying liquid crystal arrangement using an electric field generated around the liquid crystals.

Such a liquid crystal panel, which is a non-emissive display panel, requires a light supply device, such as a backlight unit, to display an image and, in general, in the liquid crystal display device, the liquid crystal panel and the BLU are combined together. Backlight units are divided into edge type backlight unit and bottom type backlight unit according to light source positions.

A backlight unit includes a light guide plate and different kinds of optical sheets so as to effectively transmit light supplied to a light source to the liquid crystal panel.

Recently, as the thickness of the liquid crystal display device has been reduced, a product, which has a small number of thin optical sheets and light guide plate and exhibits equivalent or improved effect has been developed.

Therefore, edge type backlight unit has been widely used, as compared to bottom type backlight unit, and a smaller number of optical sheets and a thin light guide plate tend to be used.

Thus, in a modern backlight unit and liquid crystal display device including the same, patterns are formed on the upper and lower surfaces of a light guide plate and serve to compensate for reduction in the number of optical sheets. However, as to a light guide plate with a patterned lower surface, light concentration effect is low and thus, it may be difficult to control output light.

Particularly, in the liquid crystal display device of the related art, moire is generated by the pattern formed on the upper or lower surface of the light guide plate, the pattern of the optical sheet, and the pattern of the liquid crystal display device, such as a black matrix.

SUMMARY

A backlight unit includes light sources that generate light, a light guide plate guiding light through an incidence surface opposite the light sources, emitting the light through an emission surface, and having lower patterns of a prism shape formed on the lower surface of the light guide plate opposite the emission surface by inclined surfaces and sub-inclined surfaces, and at least one optical sheet stacked on the emission surface.

In another aspect, a liquid crystal display device includes the backlight unit and a liquid crystal panel disposed on the backlight unit so as to be opposite the emission surface across the at least one optical sheet, and including a substrate provided with a black matrix formed thereon.

In yet another aspect, a fabrication method of a backlight unit includes preparing at least one light source emitting light, preparing a base of a light guide plate including an incidence surface upon which light from the at least one light source is incident, and an emission surface from which the light incident upon the incidence surface is emitted, forming an upper pattern on the emission surface of the base, and forming lower patterns of a prism shape on the lower surface of the base opposite the emission surface, each of the lower patterns including an inclined surface and a sub-inclined surface.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EXEMPLARY EMBODIMENTS

Figure 1:
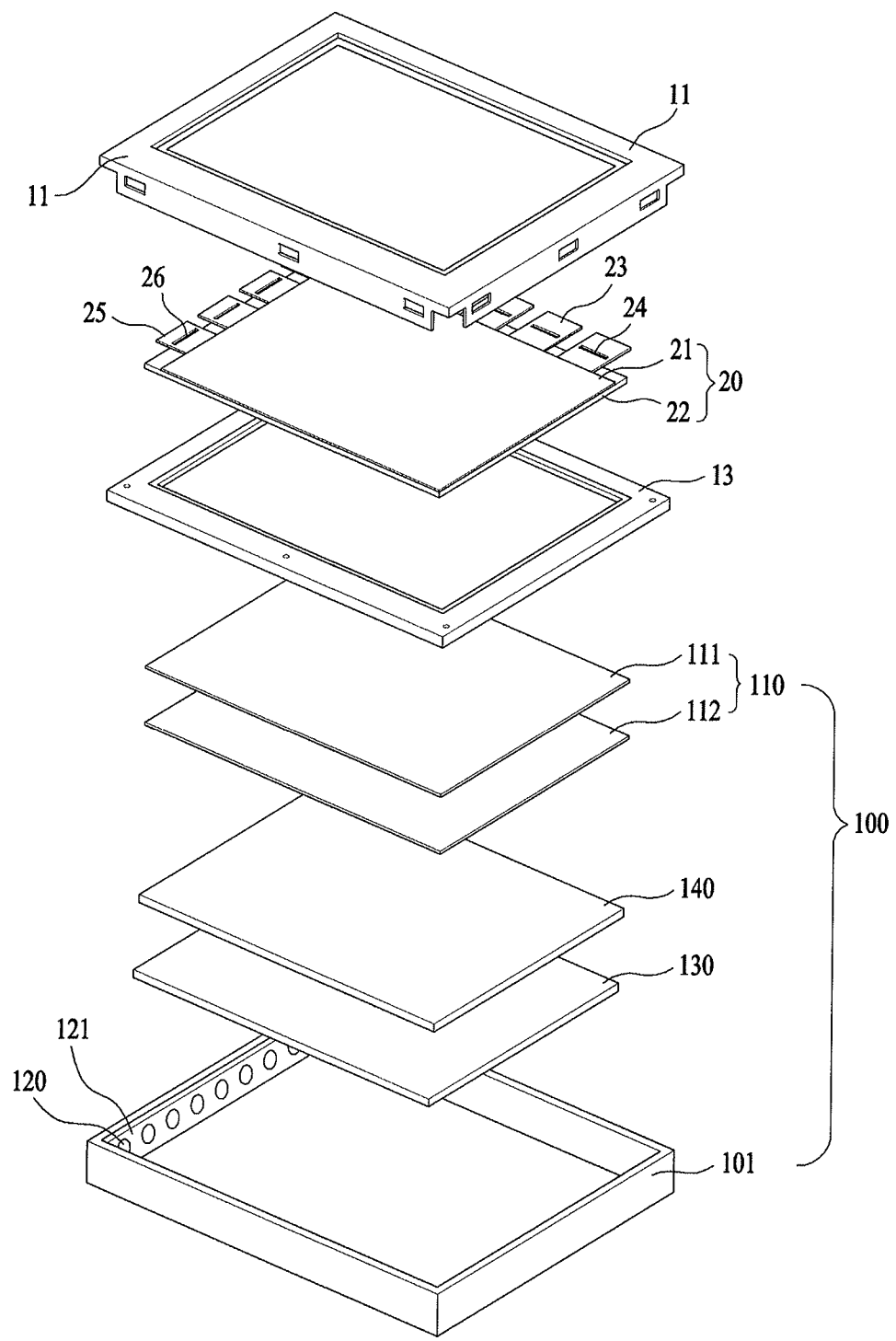
FIG. 1 is an exploded perspective view schematically illustrating one example of a backlight unit and a liquid crystal display device having the same in accordance with one embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may make the subject matter of the present invention rather unclear. In the drawings, sizes may be exaggerated, omitted, or schematically illustrated for convenience and clarity of description. Further, the sizes of the respective elements do not represent actual sizes thereof.

FIG. 1 is an exploded perspective view schematically illustrating one example of a backlight unit and a liquid crystal display device having the same in accordance with one embodiment of the present invention.

With reference to FIG. 1, the liquid crystal display device in accordance with the embodiment of the present invention includes an upper case 11, a liquid crystal panel 20, and a backlight unit 100.

The liquid crystal panel 20 is stacked on a panel support unit of a panel guide 13 and displays an image by adjusting transmittance of light supplied from the backlight unit 100. The liquid crystal panel 20 includes an upper substrate 21, a lower substrate 22, and liquid crystals (not shown) formed between the upper substrate 21 and the lower substrate 22.

Blue, green, and red color filters, a black matrix (BM), and a common electrode are formed on the upper substrate 21.

Thin film transistors formed in cell areas defined by data lines and gate lines and pixel electrodes connected to the thin film transistors are formed on the lower substrate 22. The thin film transistors supply data signals, supplied from the data lines, to the pixel electrodes in response to gate signals supplied from the gate lines. Here, the common electrode formed on the upper substrate 21 may be formed on the lower substrate 22, and embodiments of the present invention are not limited thereto. Further, data pad areas respectively connected to the data lines and gate pad areas respectively connected to the gate lines are provided in the non-display area of the lower substrate 22.

Data circuit films 23 on which data integrated circuits (ICs) 24 to supply image signals to the data lines are mounted are combined with the data pad areas. Plural data circuit films 23 may be provided. Each data circuit film 23 may be a tape carrier package (TCP) or a chip on film (COF). The data ICs 24 receive data signals and control signals from a printed circuit board (PCB) (not shown), and supply the data signals to the respective data lines. The data ICs 24 may be mounted on the lower substrate 22 in a chip on glass (COG) type. In this case, the data ICs 24 mounted on the lower substrate 22 may receive the data signals and the control signals from the PCB a main board through a flexible printed circuit (FPC).

Gate circuit films 25 on which gate ICs 26 to supply gate signals to the gate lines are mounted are combined with the gate pad areas. Plural gate circuit films 25 may be provided. Each gate circuit film 25 may be a TCP or a COF. The gate ICs 26 may be mounted on the lower substrate 22 in a COG type. At least one gate driver may be built in the lower substrate 22.

The gate ICs 26 or the gate driver use gate control signals, supplied from the PCB (not shown), to supply gate signals to the respective gate lines.

The panel guide 13 serves to surround the edges of a light guide plate 140, optical sheets 110, and a reflective sheet 130, to fix the light guide plate 140, the optical sheets 110, and the reflective sheet 130 to a lower case 101, and to support the liquid crystal panel 20. The functions of the panel guide 13 may be substituted by the lower case 101, the upper case 11, or a structure additionally provided on the lower case 101 or the upper case 11, or be omitted.

The upper case 11 is formed in a shape surrounding the non-display area of the front surface of the liquid crystal panel 20, and the upper case 11 and the lower case 110 serve to fix and accommodate the liquid crystal panel 20 and the panel guide 13.

The backlight unit 100 is disposed under the liquid crystal panel 20, generates light, and supplies the generated light to the liquid crystal panel 20. The backlight unit 100 includes light sources 120, the light guide plate 140, and the optical sheets 110. The backlight unit 100 may further include the reflective sheet 130.

The light sources 120 are mounted on a light source circuit board 121, are driven by power, and generate light. The light source 120 may be one of a light emitting diode (LED), a cold cathode fluorescent lamp (CCFL), and an external electrode fluorescent lamp (EEFL). Light emitted from the light sources 120 is incident into the light guide plate 140, and is supplied to the liquid crystal panel 20 by the light guide plate 140, the optical sheets 110, and the reflective sheet 130. Such light sources 120 are formed so as to be opposite at least one surface of the light guide plate 140.

Particularly, in the present invention, it may be advantageous that the backlight unit 100 may be of an edge type. The light guide plate 140 in the present invention induces total reflection of light emitted from the light sources 120 by lower patterns of the light guide plate 140 as well as an upper pattern of the light guide plate 140 and a light concentration sheet 112 and, thereby, increases light utilization efficiency (causes high brightness) and prevents generation of moire. Therefore, the light sources 120 formed on one side surface of the light guide plate 140 will be described in the present invention. However, the light sources 120 may be formed on at least one of the side surfaces of the light guide plate 140, and the light sources 120 and the side surfaces of the light guide plate 140 may form a bottom type backlight unit. In this case, the light guide plate 140 in the present invention may be applied to light sources 120 most affecting moire and brightness among the light sources 120 formed on the side surfaces of the light guide plate 140. The light guide plates 140 and the light sources 120 will be described in more detail later.

The optical sheets 110 concentrate and diffuse light emitted through the light guide plate 140, and transmit the light to the liquid crystal panel 20. For this purpose, the optical sheets 110 include at least one of a diffusion sheet 111 and a light concentration sheet 112.

The diffusion sheet 111 prevents light emitted through the light guide plate 140 from being concentrated on some areas and serves to uniformly disperse the light so as to transmit the light to the liquid crystal panel 20. The diffusion sheet 111 may be disposed at positions requiring dispersion of light, such as a position between the light concentration sheet 112 and the liquid crystal panel 20 and a position between the light concentration sheet 112 and the light guide plate 140. Thereby, the diffusion sheet 111 may diffuse light concentrated by the light concentration sheet 112 or the light guide plate 140 to prevent the viewing angle of the liquid crystal panel 20 from being narrowed, and uniformly transmit light to the liquid crystal panel 20. Further, the diffusion sheet 111 may be omitted as needed, but embodiments of the present invention are not limited thereto. In the present invention, the case in that the diffusion sheet 111 is disposed between the liquid crystal panel 20 and the light concentration sheet 112 will be described in detail.

The light concentration sheet 112 may condense light emitted from the light guide plate 140 and transmit the light vertically to the liquid crystal panel 20. For this purpose, a pattern for condensing light is formed on at least one of the upper surface of the light concentration sheet 112 opposite the liquid crystal panel 20 and the lower surface of the light concentration sheet 112 opposite the light guide plate 140. Particularly, the light concentration sheet 112 in the present invention may be a reverse prism sheet provided with a sheet pattern formed on the surface thereof opposite the light guide plate 140. Further, the diffusion sheet 111 may be interposed between the light concentration sheet 112 and the liquid crystal panel 20, but embodiments of the present invention are not limited thereto.

The reflective sheet 130 is disposed under the light guide plate 140 or on the side surface of the light guide plate 140, and reflects light emitted from an emission surface of the light guide plate 140 or emitted from the lower surface of the light guide plate 140 to the inside of the light guide plate 140. The position of the reflective sheet 130 may vary according to arrangement of the light sources 120. For example, in case of an edge type backlight unit, the reflective sheet 130 may be disposed under the light guide plate 140, i.e., be opposite the liquid crystal panel 20 across the light guide plate 140, as exemplarily shown in FIG. 1. Further, in case of a bottom type backlight unit, the reflective sheet 130 may be formed on the side surface of the light guide plate 140 or be omitted as needed. Embodiments of the present invention are not limited thereto, and the position of the reflective sheet 130 may be modified due to various factors, such as arrangement of the light sources 120.

The light guide plate 140 not only guides light supplied from the light sources 120 but also concentrates and diffuses the light and emits the light to the liquid crystal panel 20. An upper pattern (not shown) is formed on the surface of the light guide plate 140 opposite the liquid crystal panel 20, and lower patterns (not shown) are formed on the opposite surface of the light guide plate 140. Through the upper pattern and the lower patterns, the light guide plate 140 effectively supplies light, supplied from the light sources 120, to the liquid crystal panel 20 and reduces or prevents generation of moire. This will be described in more detail below with reference to the accompanying drawings.

Figure 2:
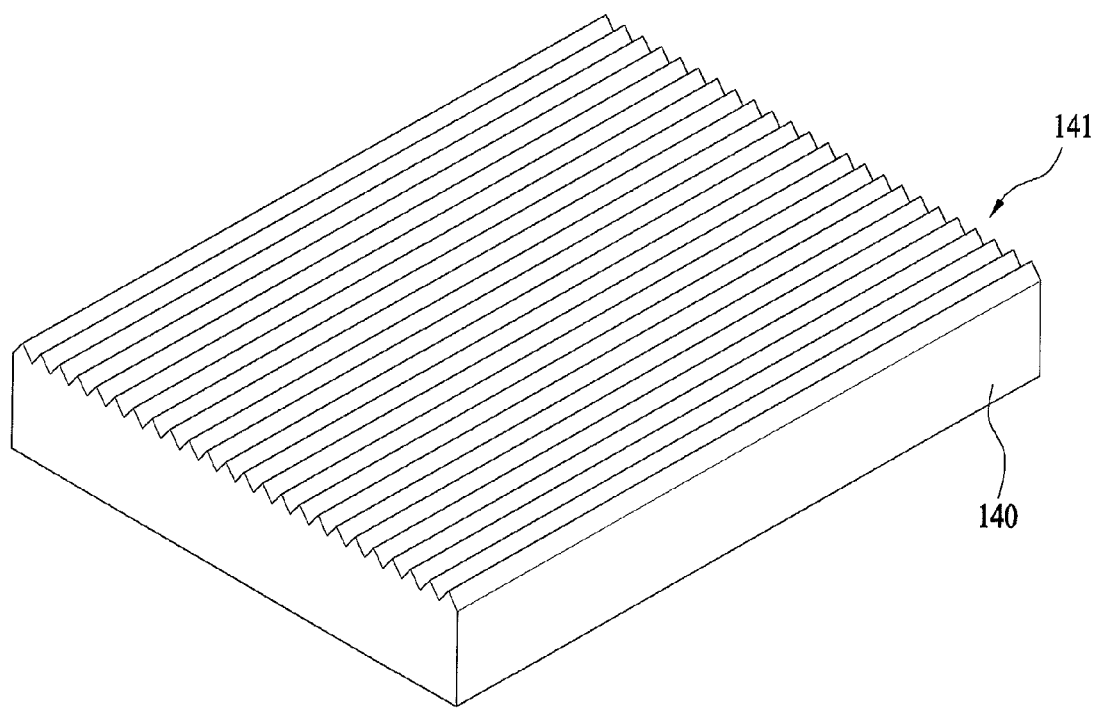
FIG. 2 is a perspective view illustrating one example of a front surface of a light guide plate in accordance with the present invention.
Figure 3A:
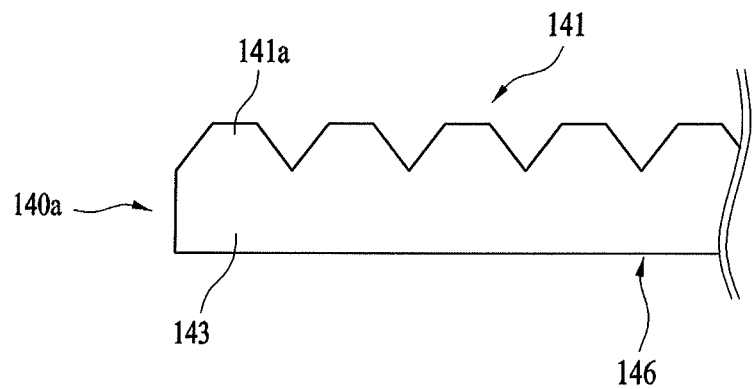
FIGS. 3A to 3C are views illustrating examples of an upper pattern.
Figure 3B:
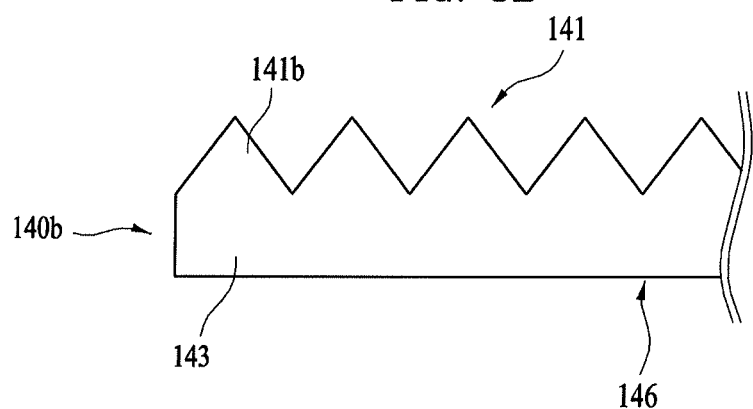
Figure 3C:
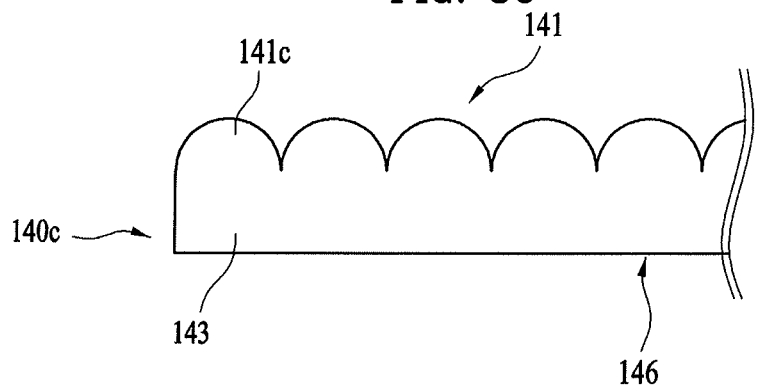
Figure 4:
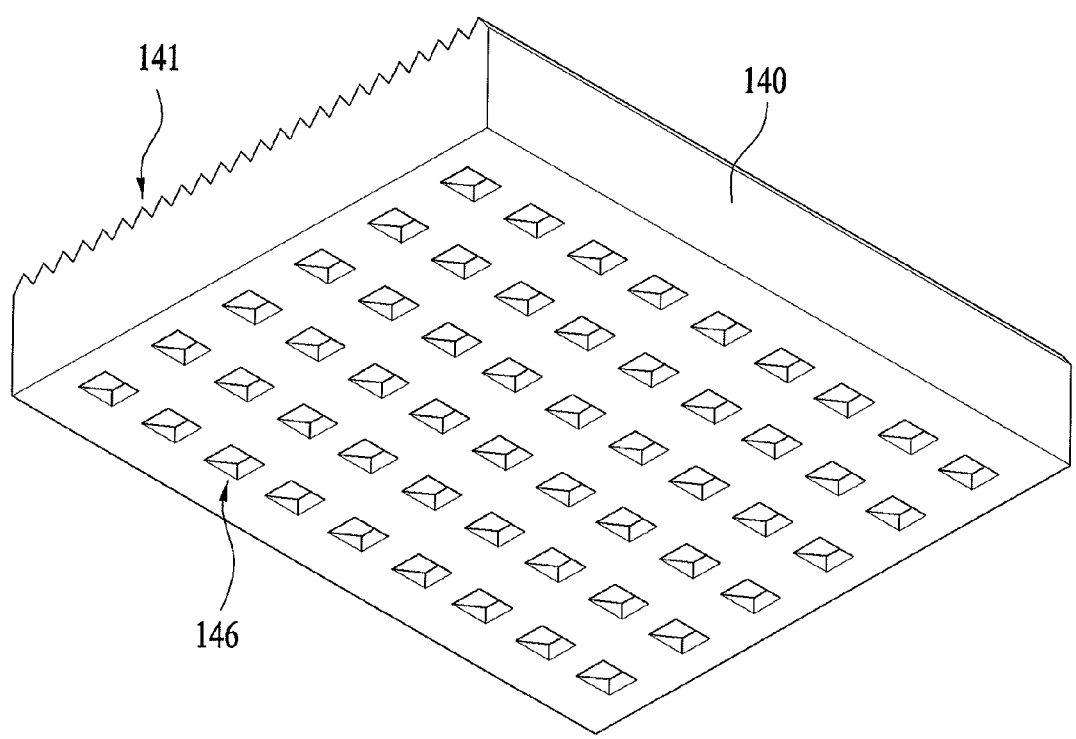
FIG. 4 is a perspective view illustrating a rear surface of the light guide plate of FIG. 2.

FIG. 2 is a perspective view illustrating one example of a front surface of the light guide plate in accordance with the present invention, FIGS. 3A to 3C are views illustrating examples of an upper pattern, and FIG. 4 is a perspective view illustrating a rear surface of the light guide plate of FIG. 2.

With reference to FIGS. 2 to 4, an upper pattern 141 and lower patterns 146 are formed on the upper and lower surfaces of a base 143 of the light guide plate 140 of the backlight unit 100 in accordance with the present invention.

The upper pattern 141 is formed on the upper surface of the light guide plate 140. The upper pattern 141 may be an engraved, i.e., V-cut, pattern. Here, the engraved pattern may be formed in an inverted triangular groove shape extending from an incidence surface to the opposite surface to traverse the upper surface of the base 143 of the light guide plate 140.

As exemplarily shown in FIG. 3A, a light guide plate 140a having an upper pattern 141a having a trapezoidal cross-section may be formed. Otherwise, as exemplarily shown in FIG. 3B, a light guide plate 140b having an upper pattern 141b having a triangular cross-section may be formed. Otherwise, an upper pattern 141c having a hemispherical cross-section may be continuously formed on a light guide plate 140c, as exemplarily shown in FIG. 3C. The cross-sectional shape of the upper pattern may be variously modified.

Such an upper pattern 141 serves to reflect light incident into the base 143 of the light guide plate 140 several times in the light guide plate 140 to uniformly disperse the light and to concentrate the light in the direction of the liquid crystal panel 20 through reflection. Particularly, the upper pattern 141 causes light beams incident upon the upper pattern 141 in a specific angle among light reflected in the upper pattern 141 to be emitted to the outside of the light guide plate 140, thus serving to increase brightness through light concentration effect of the light concentration sheet 112 and improvement of straightness of light.

Further, the lower patterns 146 are formed on the lower surface of the light guide plate 140, as exemplarily shown in FIG. 4. The lower patterns 146 are embossed or engraved on the lower surface of the base 143. A plurality of lower patterns 146 having an asymmetrical prism shape is formed. Such lower patterns 146 improve total reflection effect of light incident into the light guide plate 140, thus increasing light utilization efficiency and improving brightness. Further, the lower patterns 146 serve to uniformize or equalize light distribution in the light guide plate 140 and to reduce or prevent moire generated due to spatial frequency differences among the black matrix of the liquid crystal panel 20, the pattern of the optical sheets 110, and the upper pattern 141 of the light guide plate 140. For this purpose, pattern pitch, size, and angle of the lower patterns 146 are adjusted.

Figure 5A:
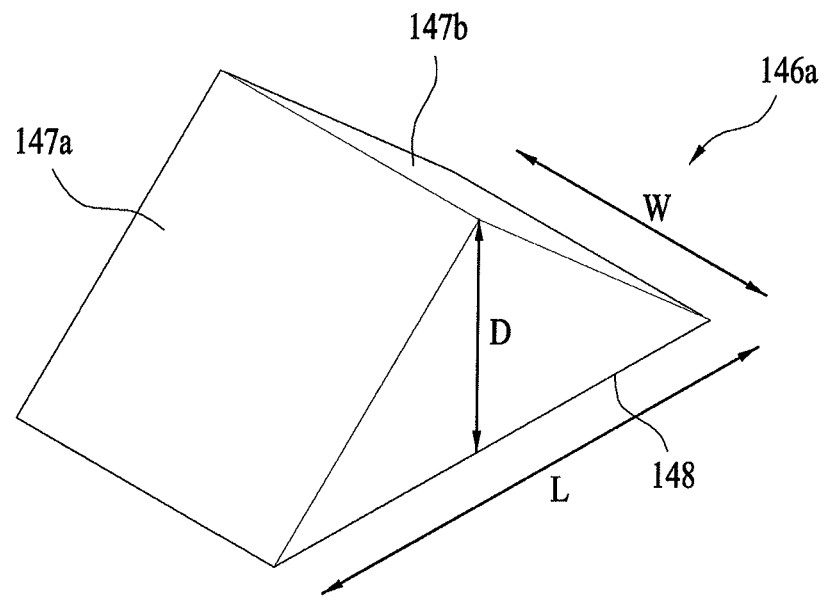
FIGS. 5A and 5B are exemplary views illustrating shapes of a lower pattern.
Figure 5B:
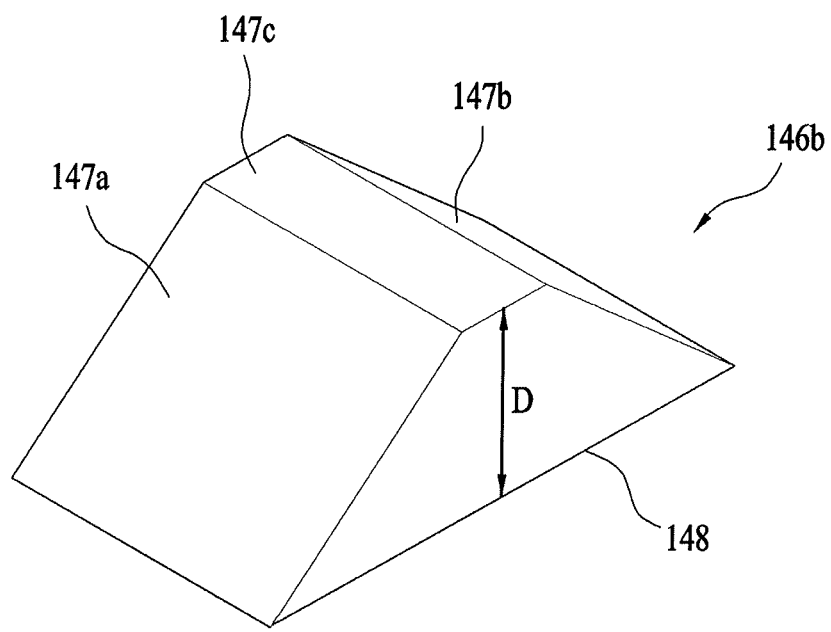
Figure 6A:
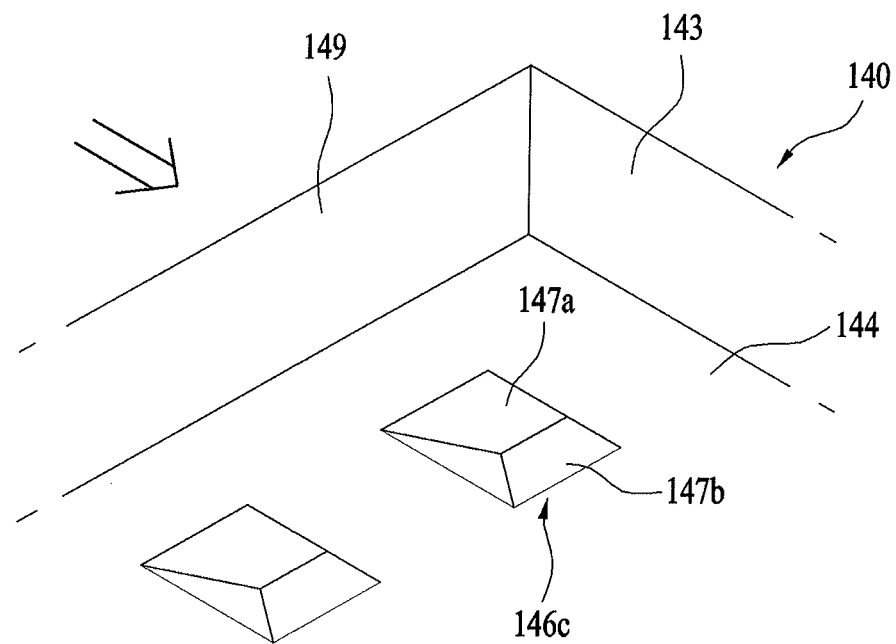
FIGS. 6A and 6B are views illustrating examples of application of embossed and engraved lower patterns to a base of the light guide plate.
Figure 6B:
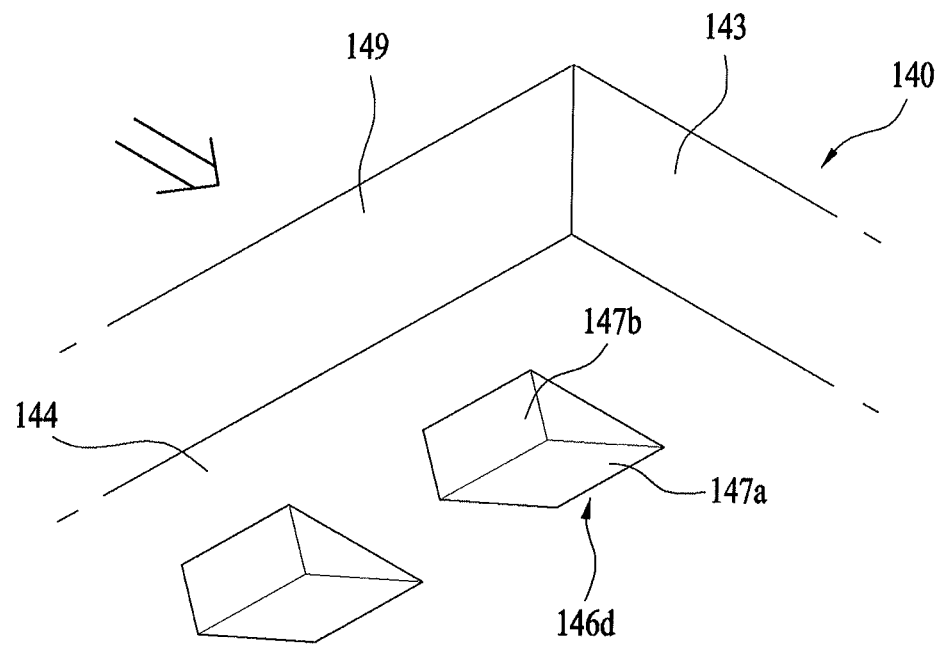

FIGS. 5A and 5B are exemplary views illustrating shapes of the lower pattern, and FIGS. 6A and 6B are views illustrating examples of application of embossed and engraved lower patterns to the base of the light guide plate.

With reference to FIGS. 5A and 5B and FIGS. 6A and 6B, the lower pattern 146 (146a and 146b) is formed in an asymmetric 3D structure. Particularly, one or more inclined surfaces 147a to reflect light are formed. Further, a sub-inclined surface 147b opposite the inclined surface 147a may be formed. The inclined surface 147a and the sub-inclined surface 147b are formed so as not to be parallel with each other. Although the sub-inclined surface 147b may be formed perpendicularly to a lower edge 148 or a lower surface, embodiments of the present invention are not limited thereto. That is, the lower pattern 146 may be formed in a shape similar to a prism, and the inclined surface 147a and the sub-inclined surface 147b may be formed asymmetrically to each other so as to achieve total reflection.

Further, a land part 147c having a gradient different from the inclined surface 147a may be formed between the inclined surface 147a and the sub-inclined surface 147b.

As such lower patterns 146, a plurality of engraved lower patterns 146c or embossed lower patterns 146d may be formed on the lower surface 144 of the light guide plate 140.

In the engraved lower pattern 146c, an inclined surface 147a faces an incidence surface 149, i.e., an incidence surface upon which light is incident, and in the embossed lower pattern 146d, a sub-inclined surface 147b faces an incidence surface 149. Thereby, light which is incident upon the incidence surface 149 and progresses to the inside of the base 143 of the light guide plate 140 is totally reflected by the incidence surfaces 147a and is then emitted to the light guide plate 140.

Further, in the present invention, the length (L) and width (W) of the lower pattern 146 are defined, as exemplarily shown in FIGS. 5A and 5B. More specifically, as seen from the side, the length of the lower edge (i.e., the lower surface of the light guide plate) 148 of a triangle (or a trapezoid) surface formed by the inclined surface 147a and the sub-inclined surface 147b is defined as the length L of the lower pattern 146, and the width of the inclined surface 147a or the sub-inclined surface 147b in a direction vertical to the direction of the length (L) is defined as the width (W) of the lower pattern 146.

This will be described below with reference to FIGS. 7A and 7B and FIG. 8.

Figure 7A:
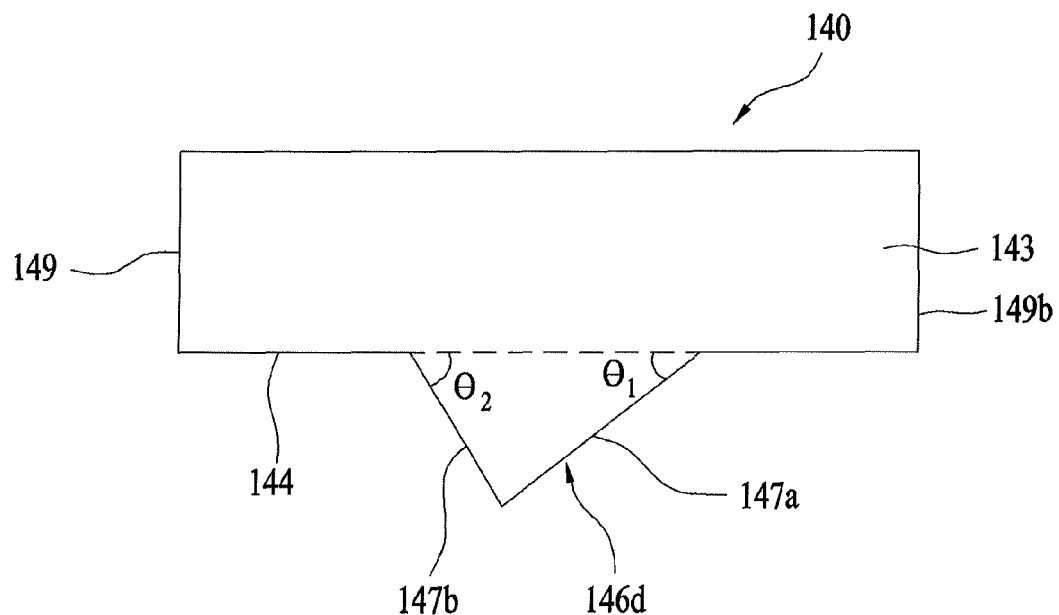
FIGS. 7A and 7B are exemplary views illustrating angles of inclined surfaces of the embossed and engraved lower patterns.
Figure 7B:
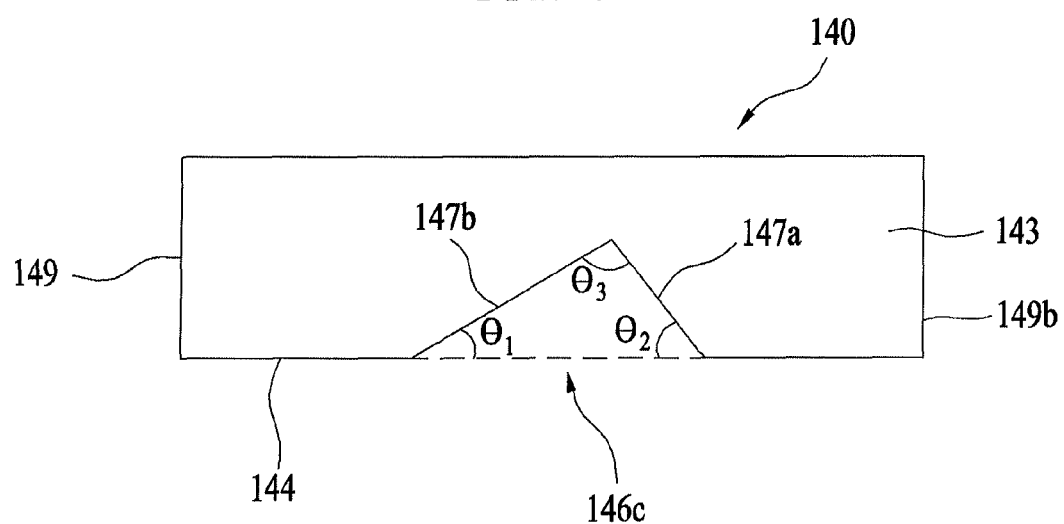
Figure 8:
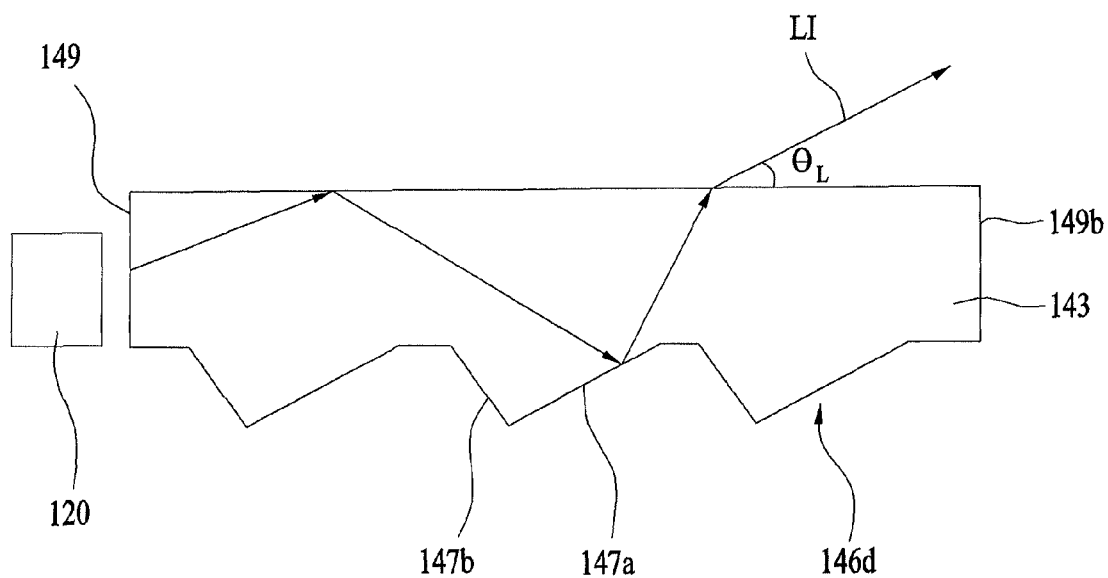
FIG. 8 is an exemplary view illustrating total reflection effect of the embossed lower patterns.

FIGS. 7A and 7B are exemplary views illustrating angles of inclined surfaces of the embossed and engraved lower patterns, and FIG. 8 is an exemplary view illustrating total reflection effect of the embossed lower patterns.

With reference to FIGS. 7A and 7B and FIG. 8, the lower patterns 146c and 146d in the present invention serve to emit light (LI) progressing within the base 143 of the light guide plate 140 through the front surface of the light guide plate 140 (or the upper pattern 141 of the front surface of the light guide plate 140). Particularly, the lower patterns 146c and 146d serve to emit light (LI) at a specific angle $\theta_L$ from the front surface of the light guide plate 140, as exemplarily shown in FIG. 8. Although FIG. 8 exemplarily illustrates the embossed lower patterns 146d, the engraved lower patterns 146c serve the same function.

Specifically, when light emitted through the front surface of the light guide plate 140 maintains a regular exit angle ($\theta_L$) with respect to the front surface of the light guide plate 140, light concentration efficiency of the light concentration sheet 112 is increased and thus, brightness increase effect may be expected. The exit angle ($\theta L$) may be in the range of 10 to 30 degrees with respect to the front surface of the light guide plate 140, and light emitted at angles within such a range is effectively concentrated by the light concentration sheet 112.

Further, light (LI) emitted at angles, which are not within the range of the exit angle ($\theta_L$), is circulated by the upper pattern 141 of the light guide plate 140 or the light concentration sheet 112 and is thus reused. That is, the light guide plate 140 in the present invention emits light (LI) in a direction favorable for concentration by the upper pattern 141 and the light concentration sheet 112, i.e., in a direction in which total reflection effect may be optimized. Further, utilization efficiency of light circulated and consumed between the light concentration sheet 112 or the upper pattern 141 and the lower surface 144 of the light guide plate 140 may be improved and thus, light concentration efficiency and brightness may be improved despite the same light sources being used.

In order to acquire these effects, as exemplarily shown in FIGS. 7A and 7B, the engraved and embossed lower patterns 146c and 146d, each of which has the inclined surface 147a, as described above, are formed on the lower surface 144 of the light guide plate 140. Further, the path of incident light (LI) or light (LI) moving within the light guide plate 140 is changed by total reflection using the inclined surface 147a, as exemplarily shown in FIG. 8, and thus, the light (LI) may be emitted at a specific angle $\theta_L$. For this purpose, the inclined surface 147a of the engraved lower pattern 146c or the embossed lower pattern 146d has a predetermined gradient.

Specifically, as exemplarily shown in FIGS. 7(a) and 7B, an inclination angle ($\theta 1$) formed by the inclined surface 147a and the lower surface 144 of the light guide plate 140 is less than an inclination angle ($\theta 2$) formed by the sub-inclined surface 147b and the lower surface 144 of the light guide plate 140 ($\theta 1 < \theta 2$). More specifically, the inclination angle ($\theta 1$) may be in the range of 5 to 10 degrees so that total reflection effect may be improved and the exit angle may be adjusted to a specific angle of 10 to 30 degrees. Further, an included angle ($\theta 3$) between the inclined surface 147a and the sub-inclined surface 147b may be 50 to 170 degrees.

Of course, the inclined surface angle ($\theta 1$), the sub-inclined surface angle ($\theta 2$), and the included angle ($\theta 3$) may deviate from the above-described ranges. In this case, total reflection effect is lowered and brightness improvement effect is lowered and thus, it may be difficult to expect effect improvement due to the lower patterns 146.

Further, the inclined surface 147a of the lower pattern 146 is arranged in a shape to reflect light incident upon the incidence surface 149 of the light guide plate 140, as described above. Specifically, the embossed lower pattern 146d is formed on the lower surface 144 of the light guide plate 140 such that the sub-inclined surface 147b faces the incidence surface 149 and the inclined surface 147a faces an anti-incidence surface 149b, i.e., one side surface of the light guide plate 140 opposite the incidence surface 149.

On the other hand, the engraved lower pattern 146c may be formed in a shape reverse to the shape of the embossed lower pattern 146d. Specifically, the engraved lower pattern 146c may be formed on the lower surface 144 of the light guide plate 140 such that the inclined surface 147a faces the incidence surface 149 and the sub-inclined surface 147b faces the anti-incidence surface 149b.

Figure 9A:
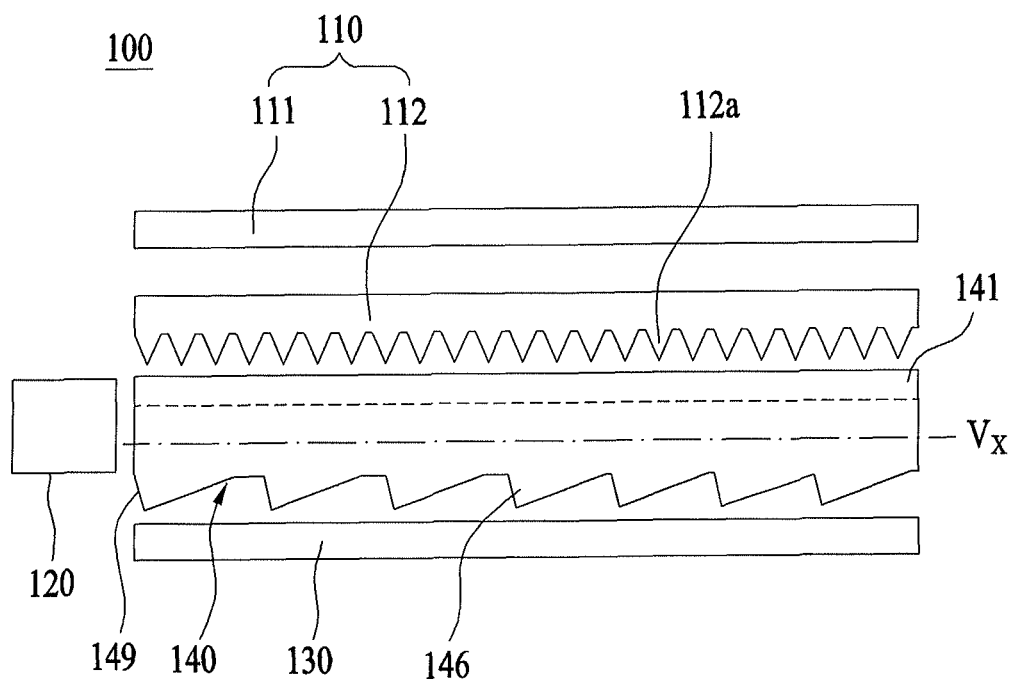
FIGS. 9A and 9B are exemplary views illustrating the structure of the backlight unit.
Figure 9B:
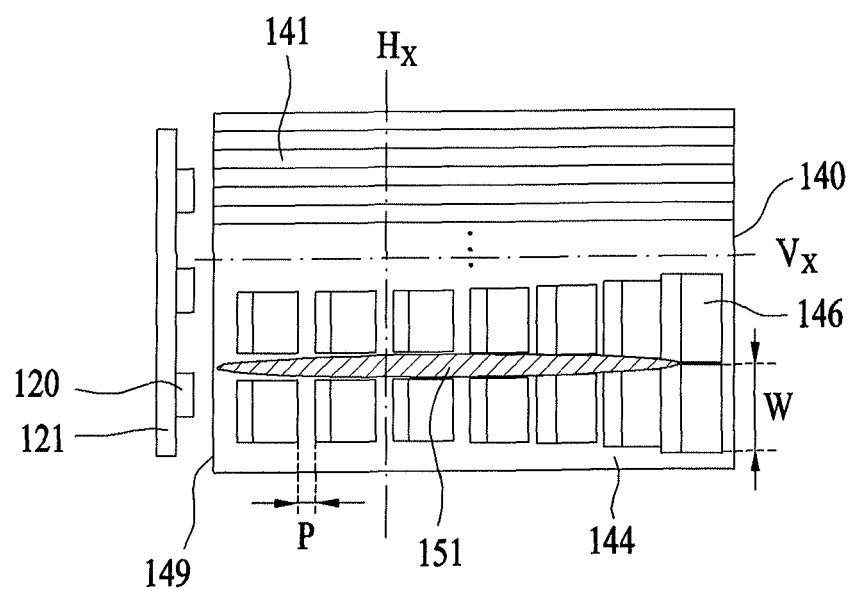
Figure 10A:
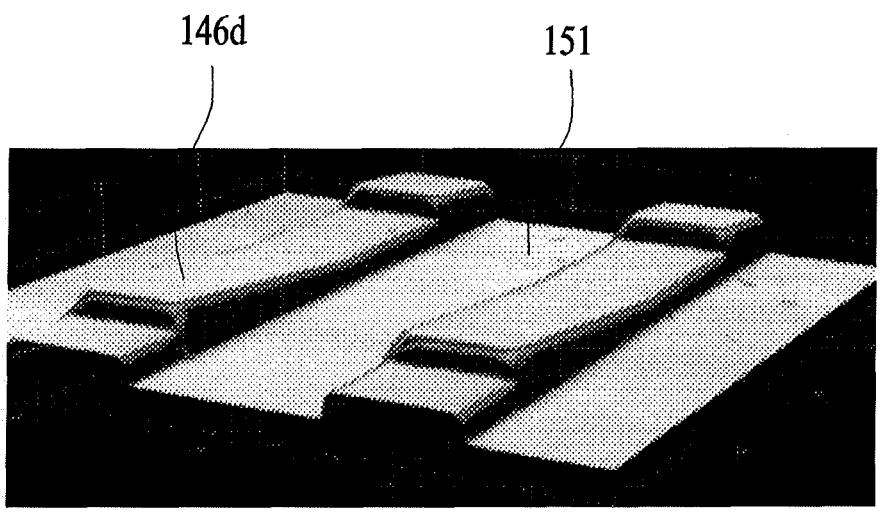
FIGS. 10A and 10B are views illustrating one example of formation of the embossed lower patterns.
Figure 10B:
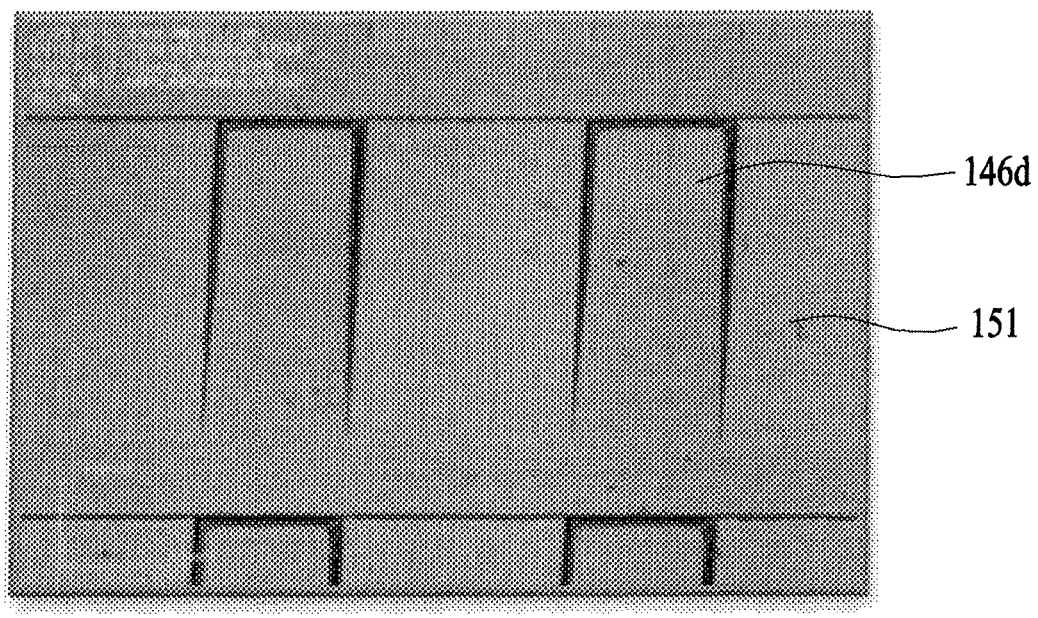

FIGS. 9A and 9B are exemplary views illustrating the structure of the backlight unit, and FIGS. 10A and 10B are views illustrating one example of formation of the embossed lower patterns.

With reference to FIGS. 9A and 9B and FIGS. 10A) and 10B), the backlight unit 100 is formed by sequentially stacking the optical sheets 110, the light guide plate 140, and the reflective sheet 130, and arranging the light sources 120 on one side surface of the light guide plate 140, i.e., the incidence surface 149, as exemplarily shown in FIG. 9A.

In such a backlight unit 100, the light guide plate 140 is located on the reflective sheet 130, and the optical sheets 110 are arranged on the light guide plate 140. Particularly, the lower patterns 146 are formed on the lower surface 144 of the light guide plate 140 in a saw-toothed shape along the vertical axis, as exemplarily shown in FIG. 8. The upper pattern 141 is formed on the upper surface of the light guide plate 140 in parallel with the vertical axis.

The optical sheets 110 are stacked on the light guide plate 140, and include the light concentration sheet 112 stacked on the upper pattern 141 of the light guide plate 140 and the diffusion sheet 111 formed on the light concentration sheet 112. The light concentration sheet 112 is stacked on the light guide plate 140 such that the sheet pattern 112a faces the upper pattern 141 of the light guide plate 140, as exemplarily shown in FIG. 9A. Here, the sheet pattern 112a is formed in a prism shape (or a lenticular lens shape) extended in one direction in the same manner as the upper pattern 141 of the light guide plate 140. The light concentration sheet 112 is arranged on the light guide plate 140 such that the sheet pattern 112a intersects the upper pattern 141 of the light guide plate 140.

FIG. 9B is a view illustrating relations between the light sources 120 and the upper pattern 141 and lower patterns 146. As exemplarily shown in FIG. 9B, the upper pattern 141 is formed in one direction in parallel with the vertical axis (Vx). Further, the lower patterns 146 are arranged in a direction of the vertical axis (Vx), and may be configured such that a pattern pitch (P) gradually decreases and a pattern width (W) gradually increases as the lower patterns 146 become distant from the incidence surface 149. Thereby, reflectance of light by the lower patterns 146 at a region distant from the light sources 120, i.e., a region in which the optical density is relatively low, is increased and thus, light distribution of the entire light guide plate 140 is uniformized.

FIGS. 10A and 10B are views illustrating one example of formation of the embossed lower patterns 146d. As FIGS. 9A and 9B and FIGS. 10A and 10B, the embossed lower patterns 146d protrude from the lower surface 144 of the light guide plate 140. A flat surface 151 is formed in a space between the lower patterns 146. Although FIG. 9B illustrates the flat surface 151 as being formed in a direction parallel with the vertical axis (Vx), a flat surface 151 is formed between the lower patterns 146 in a direction parallel with the horizontal axis (Hx).

The light guide plate 140 in the present invention has the flat surface 151 in spaces between the lower patterns 146, thus allowing incident light to be uniformly propagated to other regions of the light guide plate 140. Specifically, among light incident upon the light guide plate 140, light progressing to the flat surface 151 is reflected to the inside of the light guide plate 140 by the flat surface 151 and is diffused in the light guide plate 140 by the upper pattern 141. Further, a part of the light reflected by the flat surface 151 is emitted from the upper surface of the light guide plate 140 by the lower patterns 146 and the upper pattern 141, and the remaining part is re-reflected in the light guide plate 140 and is used so as to contribute to increase of uniformity and utilization efficiency of light.

Figure 11:
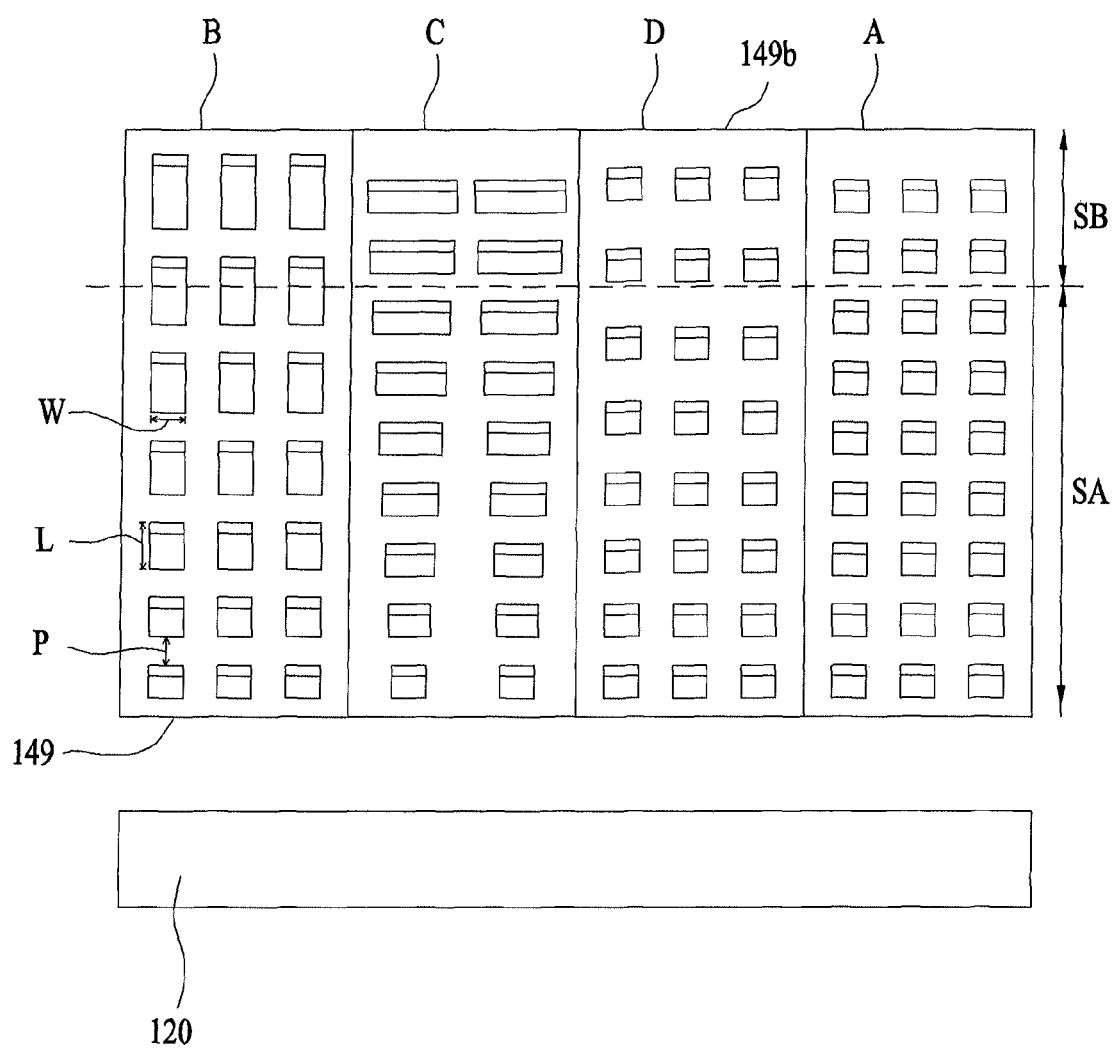
FIG. 11 is an exemplary view illustrating formation of the lower patterns.

FIG. 11 is an exemplary view illustrating formation of the lower patterns.

The light guide plate 140 in the present invention serves to increase light utilization efficiency due to the lower patterns 146 to improve brightness, as described above. Further, the light guide plate 140 in the present invention uniformizes light distribution throughout the front surface of the light guide plate 140, and prevents or reduces generation of moire.

For this purpose, the lower patterns 146 may be formed on the light guide plate 140 such that the length, width, and angle of the lower patterns 146 and the pitch between the lower patterns 146 vary.

In the edge type backlight unit 100, in general, the light sources 120 are formed opposite the incidence surface 149 which is one of four side surfaces of the light guide plate 140. Therefore, a region of the light guide plate 140 close to the incidence surface 149 adjacent to the light sources 120 has high optical density and thus has high brightness, and the anti-incidence surface 149b relatively distant from the light sources 120 has low optical density and thus has lowered brightness. That is, as a region of the light guide plate 140 is closer to the anti-incidence surface 149b, the optical density is lowered and the region becomes dark, and thus image quality is lowered.

In order to remove such density differences of light, the lower patterns 146 in the present invention may vary at least one of pattern length (L), pattern width (W), pitch (P) between the patterns 146, inclined surface angle (θ1), and depth (D) at a region adjacent to the incidence surface 149 and a region adjacent to the anti-incidence surface 149b. Here, the depth (D) means the shortest distance from the lower surface 144 of the light guide plate 140 to an edge where the inclined surface 147a and the sub-inclined surface 147b meet, or the distance from the lower surface of the light guide plate 140 to the land part 147c formed between the inclined surface 147a and the sub-inclined surface 147b.

Specifically, light distribution of the light guide plate 140 may be adjusted by adjusting the amount of light reflected to the front surface of the light guide plate 140 by increasing the area of the inclined surfaces 147a at a region close to the anti-incidence surface 149b having a relatively low optical density as compared to the area of the inclined surfaces 147a at a region close to the incidence surface 149 having a relatively high optical density.

For this purpose, among the plural lower patterns 146, the pattern width (W) of the lower patterns 146 adjacent to the incidence surface 149 may be decreased as compared to the pattern width (W) of the lower patterns 146 adjacent to the anti-incidence surface 149b, or the pattern length (L) of the lower patterns 146 adjacent to the incidence surface 149 may be decreased as compared to the pattern length (L) of the lower patterns 146 adjacent to the anti-incidence surface 149b. Otherwise, among the plural lower patterns 146, the pitch (P) between the lower patterns 146 adjacent to the incidence surface 149 may be increased as compared to the pitch (P) between the lower patterns 146 adjacent to the anti-incidence surface 149b.

Thereby, by varying the reflection area of the lower patterns 146 per unit area of the light guide plate 140, distribution of light emitted by the light guide plate 140 may be uniformly adjusted. Further, even in case of the lower patterns 146 adjacent to the anti-incidence surface 149b or the incidence surface 149, the length (L), the width (W), and the pitch (P) between the patterns 146 may vary according to a degree of adjacency to the center or both edges.

Further, if light distribution may be adjusted by adjusting concentration and dispersion of light, the inclined surface angle (θ1) and the depth (D) may vary.

More specifically, as exemplary shown in FIG. 11, the lower patterns 146 may be formed on the light guide plate 140 such that the pattern length (L), the pattern width (W), and the pattern pitch (P) are uniform (in a region A).

Otherwise, as exemplarily shown at a region B, a region C, and a region D of FIG. 11, the lower patterns 16 may be formed such that one of the pattern length (L), the pattern width (W), and the pattern pitch (P) varies.

Specifically, the region A shows one example of the lower patterns 146 in which the pattern length (L), the pattern width (W), and the pattern pitch (P) are uniform. Further, the region B shows one example of the lower patterns 146 in which the pattern width (W) and the pattern pitch (P) are uniform and the pattern length (L) increases as the distance from the incidence surface 149 increases.

Further, the region C shows one example of the lower patterns 146 in which the pattern length (L) and the pattern pitch (P) are uniform and the pattern width (W) varies according to distance from the incidence surface 149. Finally, the region D shows one example of the lower patterns 146 in which the pattern length (L) and the pattern width (W) are uniform and the pattern pitch (P) increases as the distance from the incidence surface 149 increases.

In the region B, the region C, and the region D, the reflection area of the lower patterns 146, i.e., the area of the incidence surfaces 147a, adjacent to the incidence surface 149 per unit area of the light guide plate 140 is less than the area of the incidence surfaces 147a adjacent to the anti-incidence surface 149b per unit area of the light guide plate 140. Thereby, a region having high optical density reflects a small amount of light and a region having low optical density reflects a large amount of light, thus allowing light to be uniformly emitted to the overall front surface of the light guide plate 40.

Further, the lower patterns 146 may be formed in combination of variations of the pattern length (L), the pattern width (W), and the pattern pitch (P).

Specifically, the light guide plate 140 is divided into a plurality of regions according to distances from the incidence surface 149 of the light guide plate 140 or optical densities, such as a first region adjacent to the incidence surface 149 and a second region adjacent to the anti-incidence surface 149b, and the lower patterns 146 may be formed such that variable factors are changed according to regions.

For example, in a first region (SA) and a second region (SB) divided by a dotted line in FIG. 11, lower patterns 146 may be formed by changing variable factors of the pattern length (L), the pattern width (W), the pattern pitch (P), and the pattern depth (D).

For example, the lower patterns 146 of the first region (SA) may be formed by uniformizing the pattern pitch (P) and varying the pattern length (L) or the pattern width (W) step by step (or linearly), and the lower patterns 146 of the second region (SB) may be formed by uniformizing the pattern length (L), the pattern width (w), and the pattern pitch (P) and causing the pattern length (L), the pattern width (w), and the pattern pitch (P) to have values different from the values of the first region (SA). Further, if the lower surface 144 of the light guide plate 140 is divided into plural regions, variable factors according to respective regions may be selected by a user, and embodiments of the present invention are not limited thereto.

Figure 12:
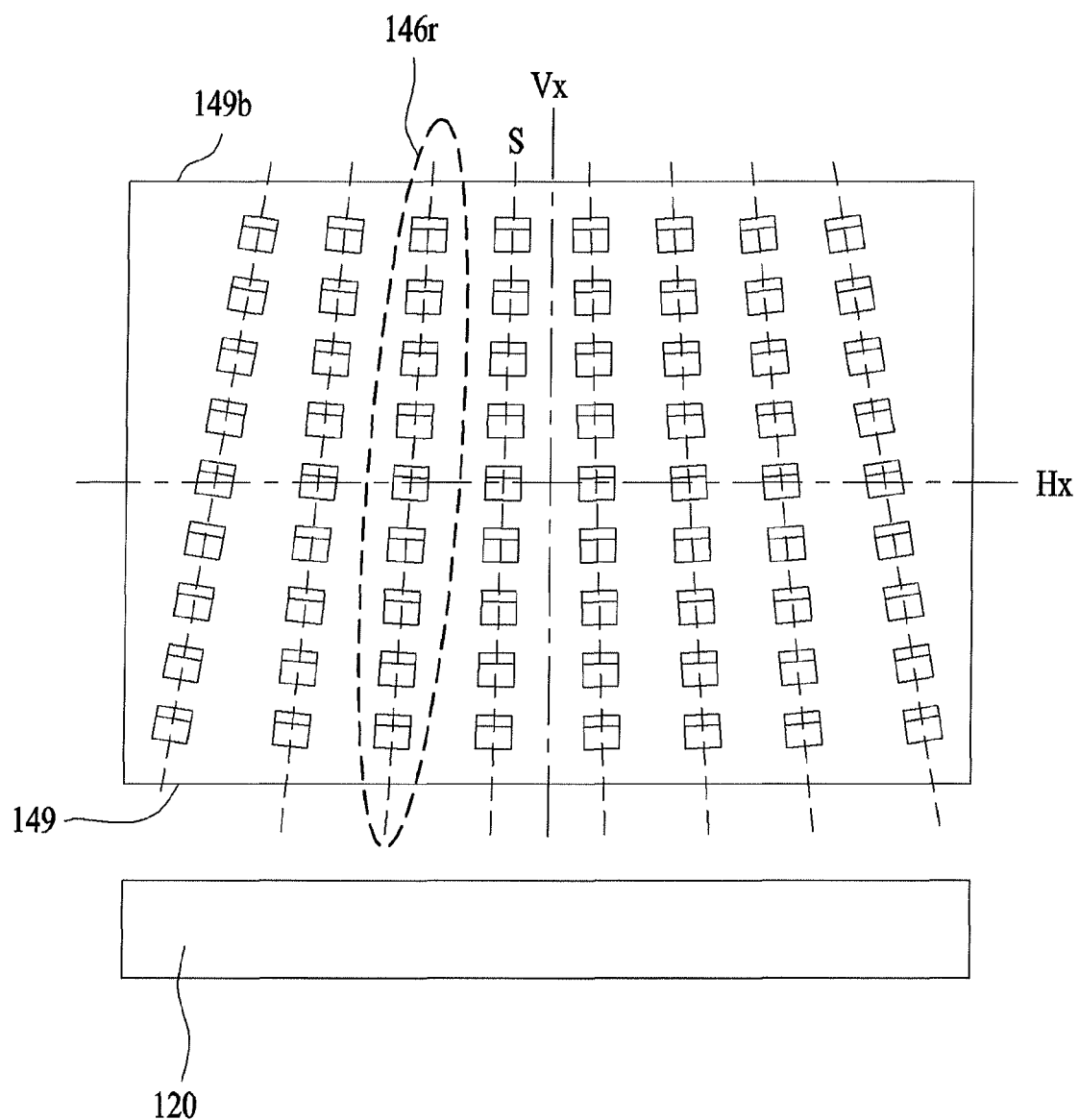
FIG. 12 is an exemplary view illustrating formation of the lower patterns to prevent moire.
Figure 13:
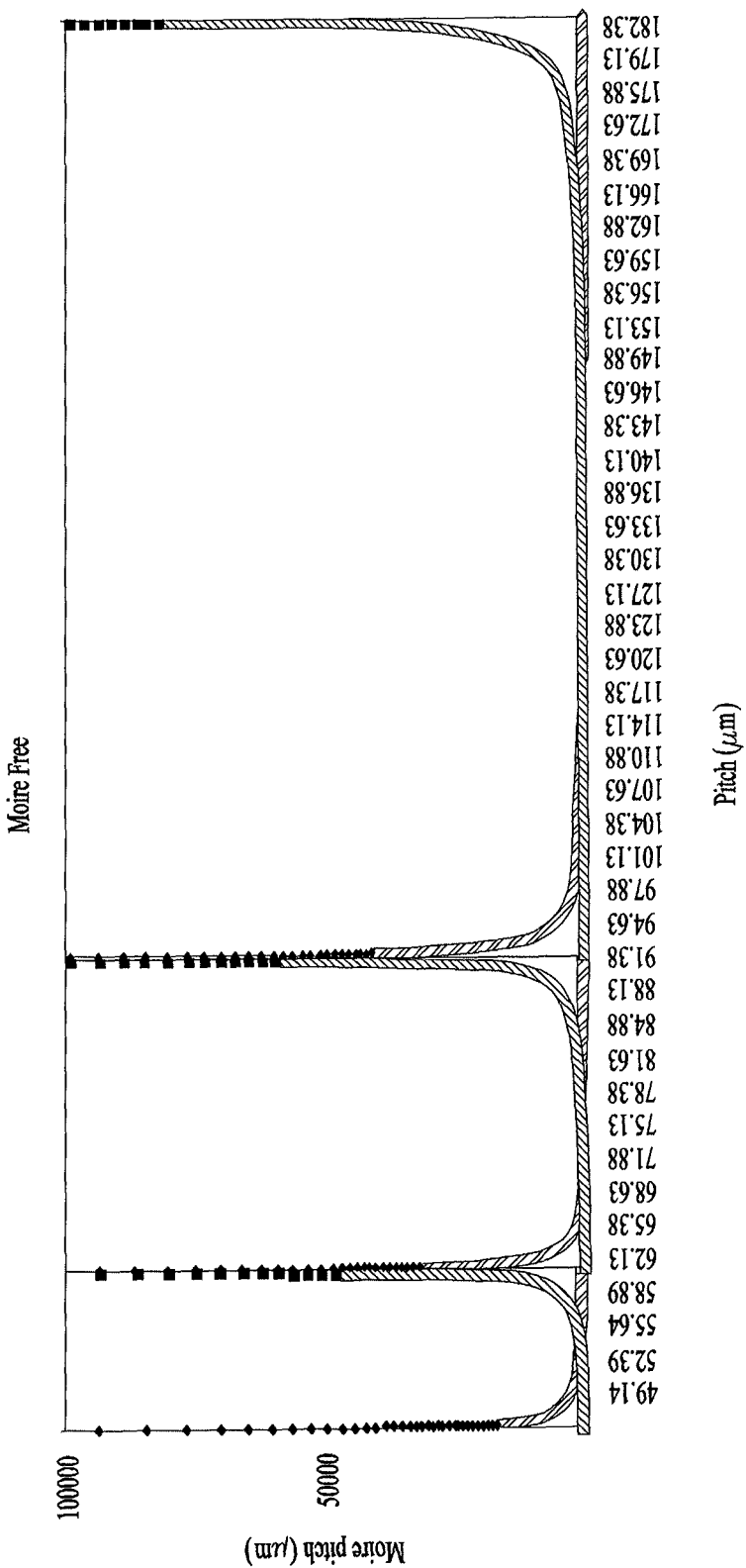
FIG. 13 is a graph illustrating pitches where moire is generated and is not generated according to pattern period of the light guide plate.
Figure 14:
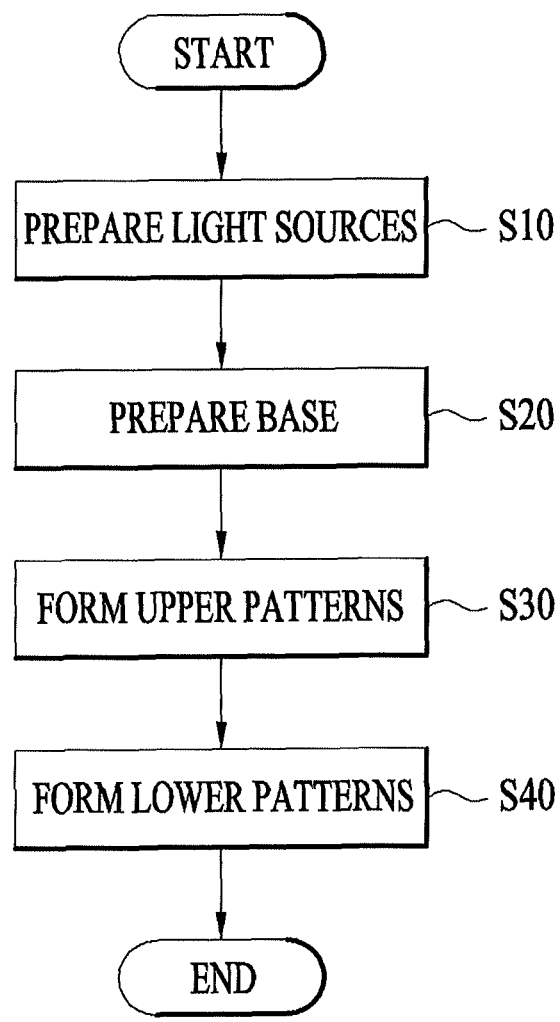
FIGS. 14 to 19 are exemplary views illustrating a process of forming patterns of a light guide plate during a fabrication method of a backlight unit in accordance with one embodiment of the present invention.

FIG. 12 is an exemplary view illustrating formation of the lower patterns to prevent moire, and FIG. 13 is a graph illustrating pitches where moire is generated and is not generated according to pattern period of the light guide plate.

With reference to FIGS. 12 and 13, the light guide plate 140 of the present invention may prevent or reduce generation of moire.

Moire means a pattern of thick stripes on a screen due to concentration and dispersion of light by the black matrix (BM) formed on the liquid crystal panel 20, the pattern of the optical sheets 110, and the pattern of the light guide plate 104. This is generated by differences of spatial frequencies among the patterns and the BM, and deteriorates image quality.

Particularly, moire is mostly generated due to differences of spatial frequencies among the black matrix (BM) of the liquid crystal panel 20 and other optical components. Therefore, generation of moire may be prevented by adjusting a panel period due to the black matrix (BM) and a period due to the light guide plate 140.

It may be understood that moire generated due to differences with the black matrix is recognized at specific distances according to the pattern pitch (P) between the lower patterns 146, for example, 62.13 μm, 91.38 μm, and 182.38 μm, by a user, as exemplarily shown in FIG. 13.

Therefore, in order to prevent generation of moire, the lower patterns 146 formed on the light guide plate 140 may be formed at pitches where moire is not generated, thus generating or reducing generation of moire.

Moire is generated due to spatial frequency differences among optical components of the liquid crystal display device, for example, among the liquid crystal panel 20, the optical sheets 110, and the light guide plate 140. Particularly, moire between the black matrix (BM) of the liquid crystal panel 20 and the lower patterns 146 of the light guide plate 140 is a main factor lowering image quality among these optical components.

In order to solve the above problem, generation of moire may be prevented or reduced by adjusting the pattern pitch (P) of the lower patterns 146.

In FIG. 13, the horizontal axis represents the pattern pitch (P) of the lower patterns 146, and the vertical axis represents visibility of moire. FIG. 13 is a graph representing generation of moire when the pattern pitch (P) between the lower patterns 146 varies under the condition that the pitch of the black matrix (BM) is uniformly maintained. FIG. 13 represents generation of moire when the pitch of the black matrix (BM) is fixed to 183 μm and the pattern pitch (P) varies from 49 μm to 183 μm, and it may be confirmed that moire is generated when the pattern pitch (P) of the lower patterns 146 is about 62 μm, 91.5 μm, and 182 μm.

Although FIG. 13 illustrates a graph representing data acquired by a test in which the pitch between columns of the black matrix (the pitch of the black matrix in the direction of the vertical axis) is fixed to 183 μm and the pattern pitch (P) between the lower patterns 146 in the direction of the vertical axis varies, the disclosure of the present invention may be applied to the pitch between rows of the black matrix (the pitch of the black matrix in the direction of the horizontal axis) and the pattern pitch (P) between the lower patterns 146 in the horizontal axis.

Specifically, it may be confirmed that, if values corresponding to about 35% to 47% and about 55% to 97% of the pitch of the black matrix (or the period of the black matrix or the distance between cells of the black matrix) are used as the pattern pitch (P) between the lower patterns 146, generation of moire is minimized. That is, in FIG. 13, if the pattern pitch (P) has values of 64.05 μm to 86.01 μm and 100.65 μm to 177.51 μm when the pitch of the black matrix is 183 μm, generation of moire may be prevented.

Otherwise, generation of moire may be prevented by tilting when the lower patterns 146 are formed, as exemplarily shown in FIG. 12. Specifically, when the lower patterns 146 are formed, the lower patterns 146 are tilted by a designated angle with respect to at least one of the vertical axis (Vx) and the horizontal axis (Hx). Thereby, overlap of the panel period and the light guide plate pattern period may be prevented and thus, generation of moire may be prevented. Here, the horizontal axis (Hx) means a direction parallel with the incidence surface 149, and the vertical axis (Vx) means a direction vertical to the incidence surface 149.

More specifically, when lower patterns 146 forming one column and one row are formed, tilted lower patterns 146 are formed so that a virtual alignment line S connecting the same positions of the respective lower patterns 146 (for example, the centers of the inclined surfaces 147a) does not become parallel with the vertical axis (Vx) or the horizontal axis (Hx). Here, the tilted angle may have a value of 2° to 10° with respect to any one axis.

As exemplarily shown in FIG. 12, the respective lower pattern columns 146r may be tilted with respect to the vertical axis (Vx). In this case, the respective lower pattern columns 146r may be tilted in parallel in one direction or be tilted by different angles in the shape of fan ribs with respect to the vertical axis (Vx).

FIGS. 14 to 19 are views illustrating a process of forming patterns of a light guide plate during a fabrication method of a backlight unit in accordance with one embodiment of the present invention.

With reference to FIGS. 14 to 19, the fabrication method of the backlight unit in accordance with the present invention includes preparing light sources (S10), preparing a base (S20), forming an upper pattern (S30), and forming lower patterns (S40).

In S10, light sources 120 using light emitting devices, such as LEDs, are prepared.

In S20, a base 143, i.e., a base material of the light guide plate 140 guiding light generated from the light sources 120 to the liquid crystal panel 20, is prepared.

Figure 15:
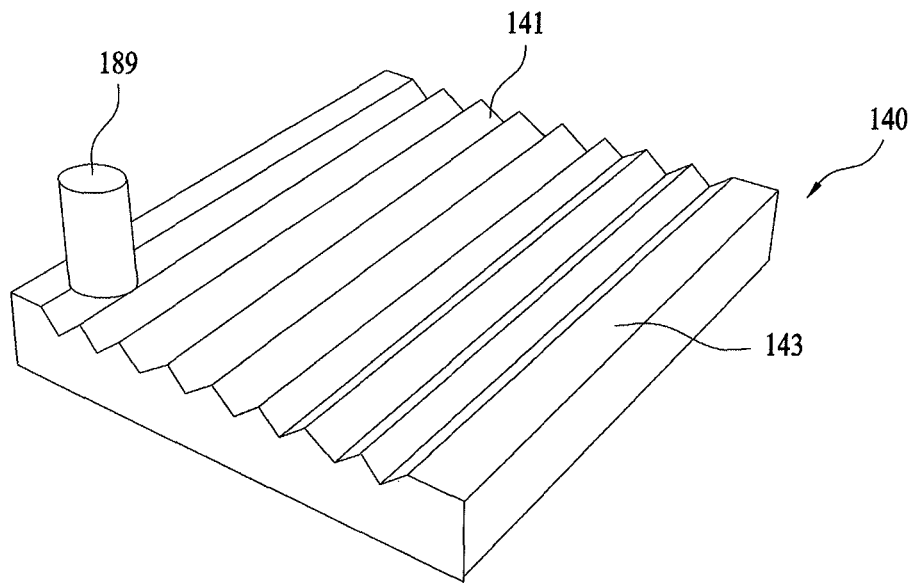

In S30, an upper pattern 141 is formed on the base 143 prepared in S20, as exemplarily shown in FIG. 15. In S30, the upper pattern 141 is formed by forming grooves by cutting the surface of the base 143 using a cutting tip.

In S40, lower patterns 146 are formed on the lower surface 144 of the base 143. In S40, engraved lower patterns 146c or embossed lower patterns 146d are formed on the lower surface 144 of the base 143.

In S40, a fabrication method varies according to whether or not the lower patterns 146 are the engraved lower patterns 146c or the embossed lower patterns 146d.

Specifically, if the engraved lower patterns 146c are formed, the engraved lower patterns 146c may be formed by forming inclined surfaces 147a and sub-inclined surfaces 147b by cutting predetermined positions using a cutting tip 189. That is, the engraved lower patterns 146c shown in FIG. 4 may be formed on the lower surface 144 of the light guide plate 140 by partially cutting positions where the lower patterns 146 will be formed.

Figure 16:
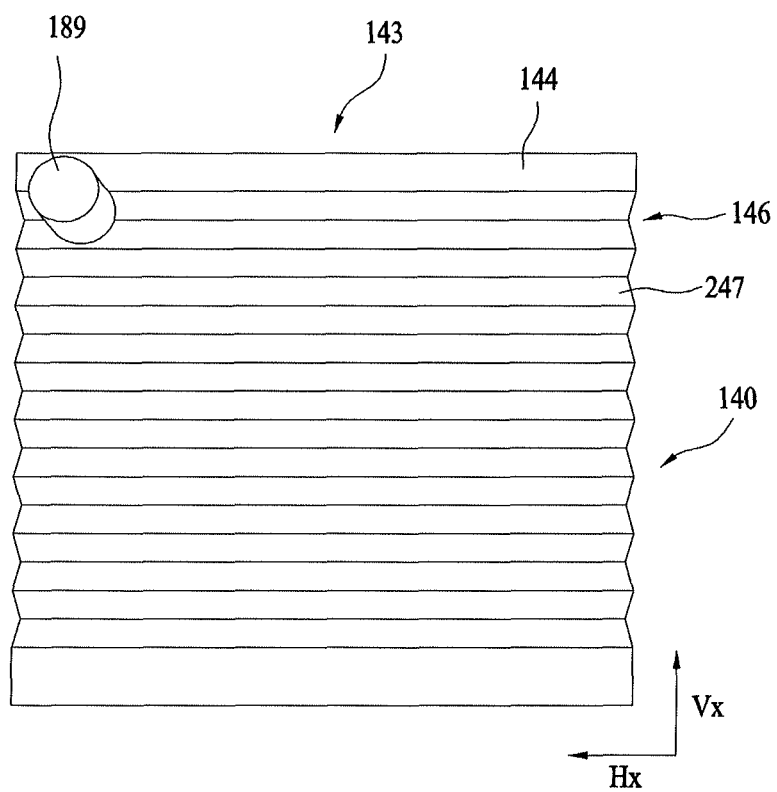
Figure 17:
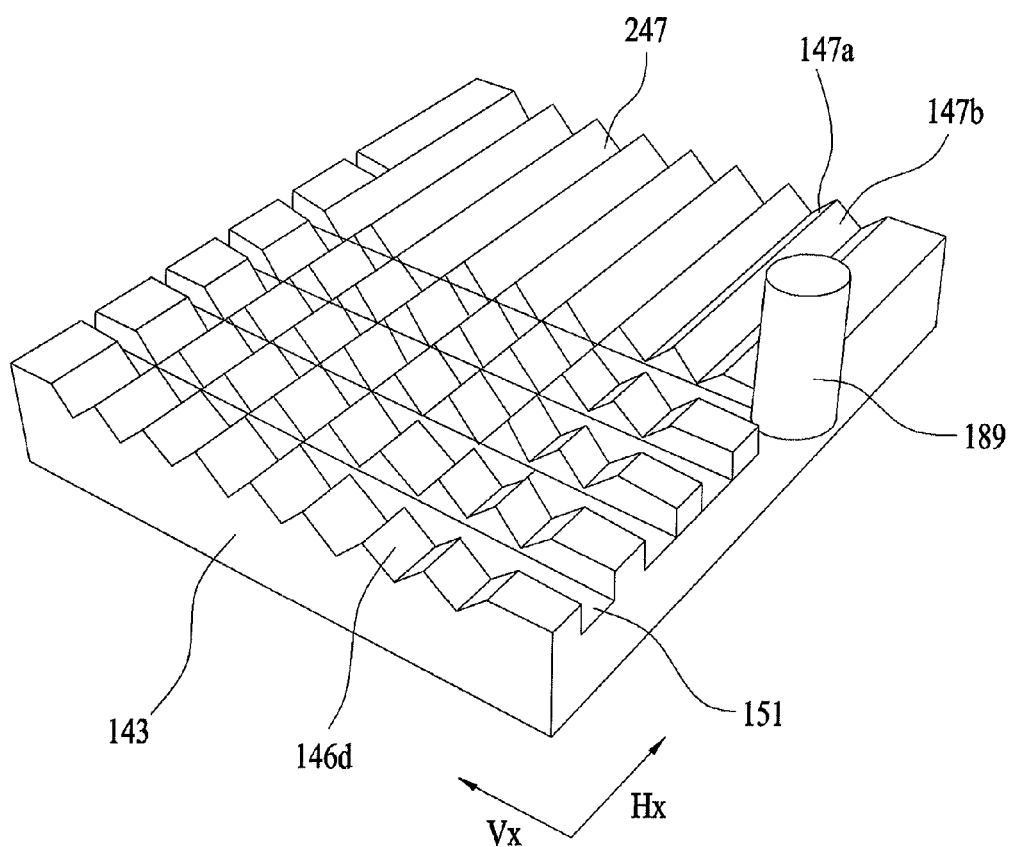
Figure 18:
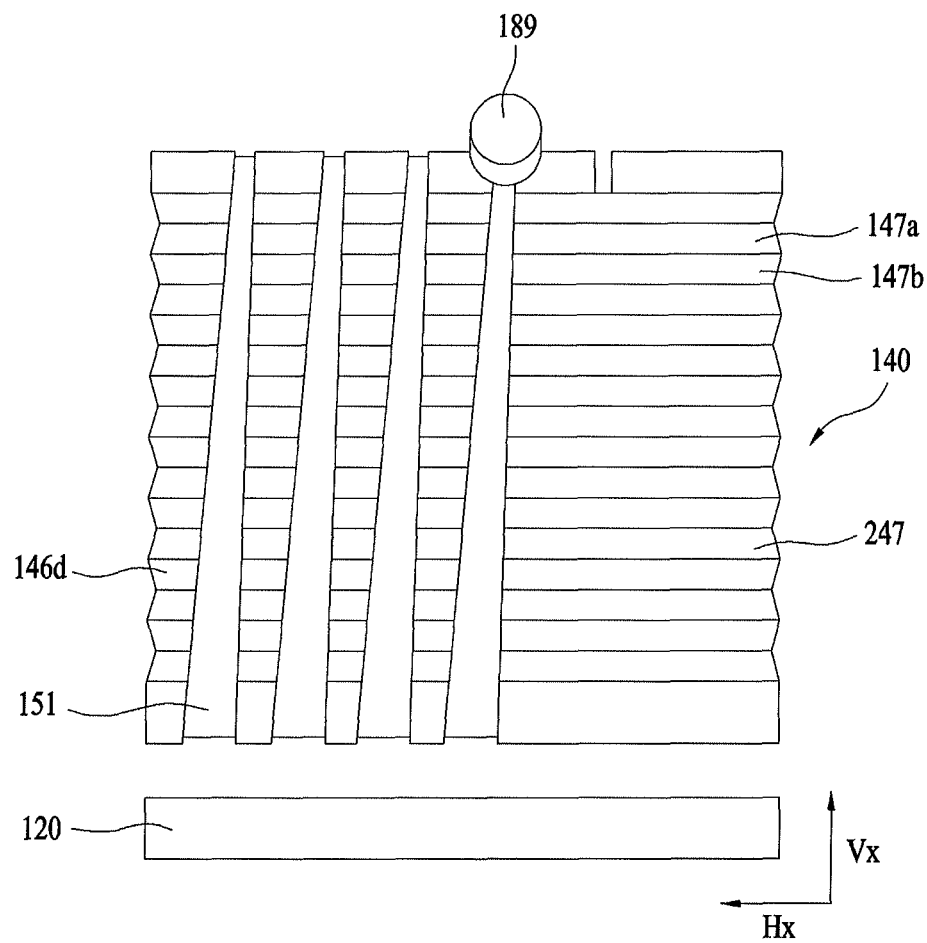

On the other hand, the embossed lower patterns 146d may be formed by a procedure shown in FIGS. 16 to 18. Specifically, S40 may include cutting the lower surface 144 of the light guide plate 140 and forming flat surfaces so as to form the embossed lower patterns 146d.

In cutting of the lower surface 144 of the light guide plate 140, grooves are formed on the lower surface 144 of the light guide plate 140 using the cutting tip 189 and thereby, a line pattern 247 in which the inclined surfaces 147a and the sub-inclined surfaces 147b are connected is formed, as exemplarily shown in FIG. 16.

In formation of flat surfaces, as exemplarily shown in FIG. 17, the line pattern 247 is separated so as to form the separated lower patterns 146d. Specifically, in formation of flat surfaces, flat surfaces 151 are formed by cutting the lower surface 144 of the light guide plate 140 provided with the line pattern 247 in a direction intersecting the line pattern 247 or a direction parallel with the line pattern 247 using the cutting tip 189. Thereby, the flat surfaces 151 are formed in the moving direction of the cutting tip 189, and the line pattern 247 is separated into respective lower patterns by the flat surfaces 151.

Particularly, S40 includes a tilting process in which the embossed lower patterns 146d are tilted by a predetermine angle with respect to the vertical axis (Vx) or the horizontal axis (Hx) of the light guide plate 140, as exemplarily shown in FIG. 18. Although FIG. 18 illustrates the embossed lower patterns 146d as being tilted in the direction of the vertical axis (Vx) by the cutting tip 189, the disclosure of the present invention is not limited thereto, and the embossed lower patterns 146d may be tilted in the direction of the horizontal axis (Hx).

Figure 19:
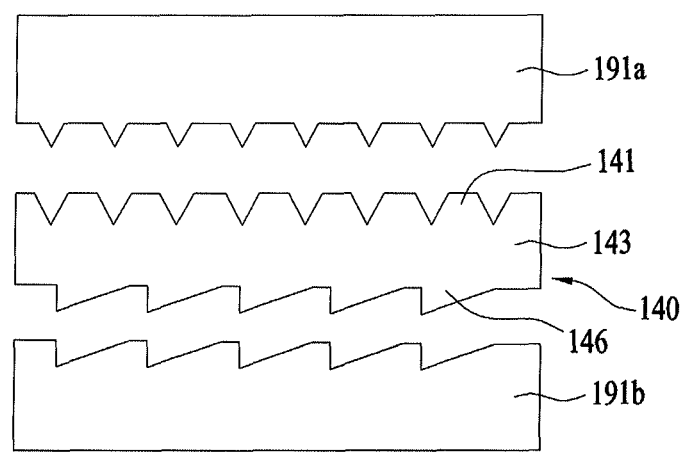

On the other hand, the light guide plate 140 may be formed by extrusion (or pressing) in addition to cutting. FIG. 19 illustrates one example of a fabrication method of a light guide plate 140 by pressing. With reference to FIG. 19, when the base 143 is prepared during Operation S20, an upper mold 191a and a lower mold 191b are prepared by the cutting method shown in FIGS. 16 to 18. In preparation of the upper and lower molds 191a and 191b, shapes corresponding to the upper pattern 141 and the lower patterns 146 are formed on the upper mold 191a and the lower mold 191b by a pre-process, such as cutting.

When the upper mold 191a and the lower mold 191b are prepared, a base 143 is interposed between the upper mold 191a and the lower mold 191b and is then pressed. When the base 143 is pressed by the upper mold 191a and the lower mold 191b, the base 143 is pressed by the shapes formed on the mold set 191 (191a and 191b) and thus, the upper pattern 141 and the lower patterns 146 are formed.

As described above, the light guide plate 140 of the present invention may be easily formed by cutting or pressing.

As apparent from the above description, a backlight unit, a liquid crystal display device having the same, and a fabrication method of the backlight unit in accordance with one embodiment of the present invention may facilitate control of output light through a light guide plate, improve light concentration effect, and reduce moire.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight unit comprising:
   light sources generating light;
   a light guide plate guiding light through an incidence surface opposite the light sources and emitting the light through an emission surface;
   a plurality of lower patterns arranged in a plurality of rows and a plurality of columns on a lower surface of the light guide plate which is opposite the emission surface, each of the plurality of lower patterns defining a prism shape including an inclined surface and a sub-inclined surface; and
   at least one optical sheet stacked on the emission surface,
   wherein either the each column of the lower patterns is tilted by a predetermined angle with respect to a vertical axis of the light guide plate which is perpendicular to the emission surface, or the each row of the lower patterns is tilted by a predetermined angle with respect to a horizontal axis of the light guide plate which is parallel to the emission surface.

2. The backlight unit according to claim 1, wherein the lower patterns are engraved lower patterns recessed into the lower surface of the light guide plate or embossed lower patterns protruded from the lower surface of the light guide plate.

3. The backlight unit according to claim 2, wherein:
   each of the engraved lower patterns is configured such that the inclined surface is closer to an edge where the incidence surface and the lower surface contact than the sub-inclined surface; and
   each of the embossed lower patterns is configured such that the sub-inclined surface is closer to an edge where the incidence surface and the lower surface contact than the inclined surface.

4. The backlight unit according to claim 1, wherein an inclined surface angle formed by the inclined surface and the lower surface is less than a sub-inclined surface angle formed by the sub-inclined surface and the lower surface.

5. The backlight unit according to claim 4, wherein the lower patterns of the light guide plate are prepared in plural number by varying at least one of a pattern pitch, a pattern width, a pattern length, and a pattern depth on the lower surface.

6. The backlight unit according to claim 5, wherein the light guide plate is configured such that the pattern pitch of the lower patterns relatively close to the incidence surface is smaller than the pattern pitch of the lower patterns relatively distant from the incidence surface.

7. The backlight unit according to claim 5, wherein the light guide plate is configured such that the pattern width, the pattern length, or the pattern depth of the lower patterns relatively close to the incidence surface is greater than the pattern width, the pattern length, or the pattern depth of the lower patterns relatively distant from the incidence surface.

8. The backlight unit according to claim 1, wherein each of the lower patterns includes a land part formed between the inclined surface and the sub-inclined surface to connect the inclined surface and the sub-inclined surface.

9. A liquid crystal display device comprising:
a backlight unit including light sources generating light, a light guide plate guiding light through an incidence surface opposite the light sources and emitting the light through an emission surface, a plurality of lower patterns arranged in a plurality of rows and a plurality of columns on a lower surface of the light guide plate which is opposite the emission surface, each of the plurality of lower patterns defining a prism shape including an inclined surface and a sub-inclined surface, and least one optical sheet stacked on the emission surface; and
a liquid crystal panel disposed on the backlight unit so as to be opposite the emission surface across the at least one optical sheet, and including a substrate provided with a black matrix formed thereon,
wherein either the each column of the lower patterns is tilted by a predetermined angle with respect to a vertical axis of the light guide plate which is perpendicular to the emission surface, or the each row of the lower patterns is tilted by a predetermined angle with respect to a horizontal axis of the light guide plate which is parallel to the emission surface.

10. The liquid crystal display device according to claim 9, wherein the lower patterns are engraved lower patterns recessed into the lower surface of the light guide plate or embossed lower patterns protruded from the lower surface of the light guide plate.

11. The liquid crystal display device according to claim 10, wherein:
each of the engraved lower patterns is configured such that the inclined surface is closer to an edge where the incidence surface and the lower surface contact than the sub-inclined surface; and
each of the embossed lower patterns is configured such that the sub-inclined surface is closer to an edge where the incidence surface and the lower surface contact than the inclined surface.

12. The liquid crystal display device according to claim 9, wherein an inclined surface angle formed by the inclined surface and the lower surface is less than a sub-inclined surface angle formed by the sub-inclined surface and the lower surface.

13. The liquid crystal display device according to claim 12, wherein the lower patterns of the light guide plate are prepared in plural number by varying at least one of a pattern pitch, a pattern width, a pattern length, and a pattern depth on the lower surface.

14. The liquid crystal display device according to claim 13, wherein the light guide plate is configured such that the pattern pitch of the lower patterns relatively close to the incidence surface is smaller than the pattern pitch of the lower patterns relatively distant from the incidence surface.

15. The liquid crystal display device according to claim 13, wherein the light guide plate is configured such that the pattern width, the pattern length, or the pattern depth of the lower patterns relatively close to the incidence surface is greater than the pattern width, the pattern length, or the pattern depth of the lower patterns relatively distant from the incidence surface.

16. The liquid crystal display device according to claim 13, wherein the pattern pitch has a value of about 35% to 47% or a value of about 55% to 97% of the pitch of the black matrix.

17. The liquid crystal display device according to claim 9, wherein each of the lower patterns includes a land part formed between the inclined surface and the sub-inclined surface to connect the inclined surface and the sub-inclined surface.

* * * * *